W. G. MOORE.
MOLDING APPARATUS.
APPLICATION FILED MAY 8, 1911.

1,013,303.

Patented Jan. 2, 1912.

2 SHEETS—SHEET 1.

WITNESSES
R A Balderson
Walter Famariss

INVENTOR
W. G. Moore
his attys

W. G. MOORE.
MOLDING APPARATUS.
APPLICATION FILED MAY 8, 1911.
1,013,303.
Patented Jan. 2, 1912.
2 SHEETS—SHEET 2.
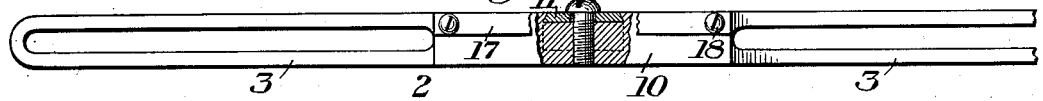
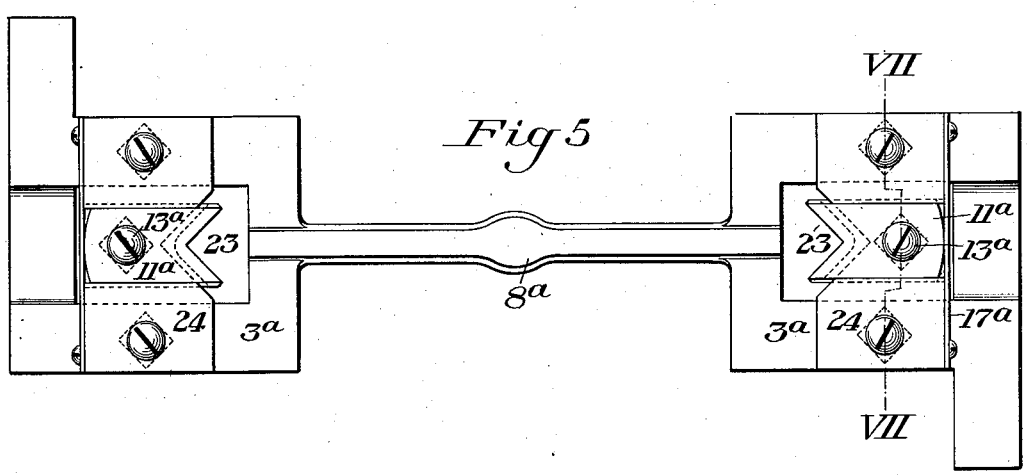
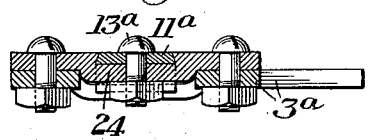
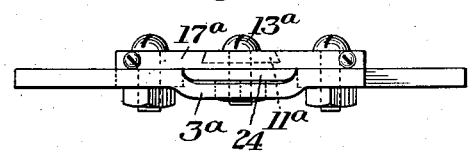
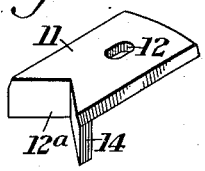
WITNESSES
INVENTOR

UNITED STATES PATENT OFFICE.

WILLIAM G. MOORE, OF INDIANAPOLIS, INDIANA, ASSIGNOR TO THE NATIONAL MALLEABLE CASTINGS COMPANY, OF CLEVELAND, OHIO, A CORPORATION OF OHIO.

MOLDING APPARATUS.

1,013,303.  Specification of Letters Patent.  Patented Jan. 2, 1912.

Application filed May 8, 1911. Serial No. 625,832.

*To all whom it may concern:*

Figure 1:
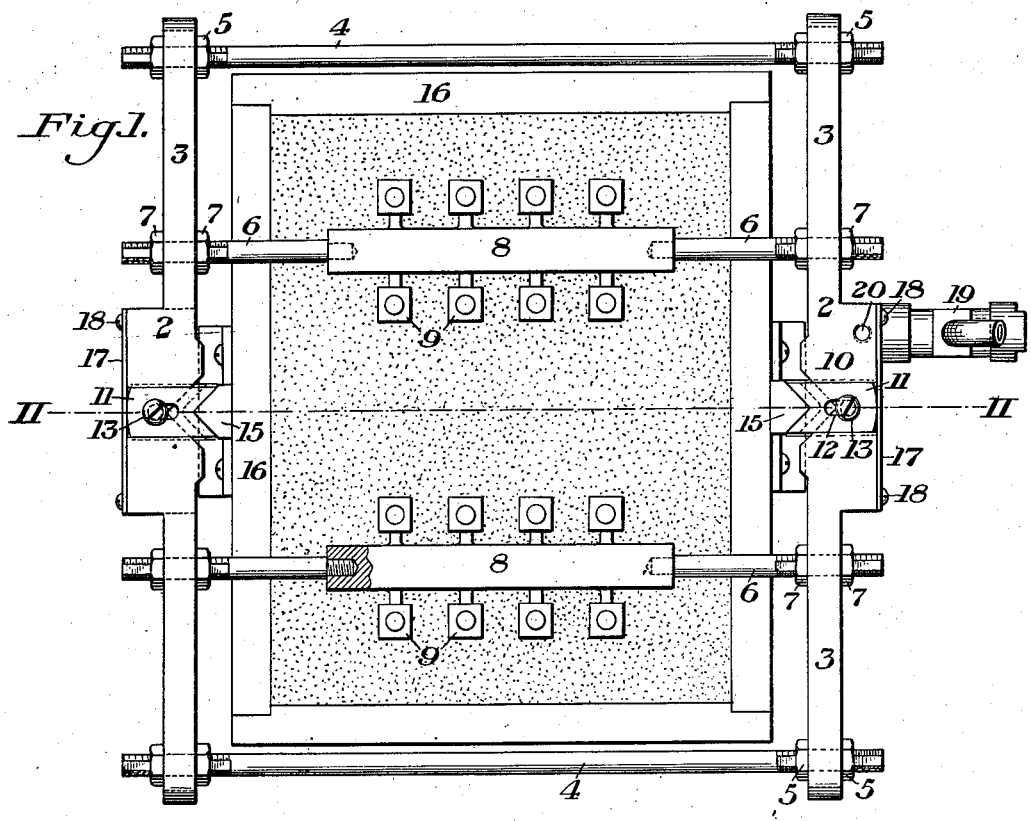
Figure 2:
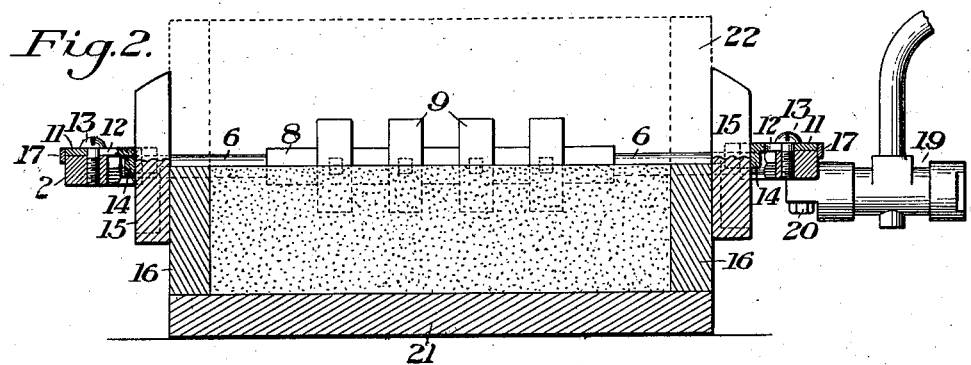
Figure 3:
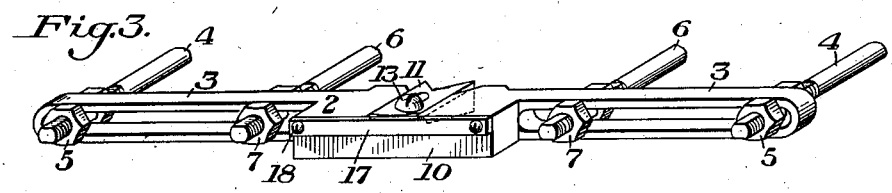

Be it known that I, WILLIAM G. MOORE, of Indianapolis, Marion county, Indiana, have invented a new and useful Improvement in Molding Apparatus, of which the following is a full, clear, and exact description, reference being had to the accompanying drawings, forming part of this specification, in which—
Figure 1 is a plan view showing my improved apparatus in position on the drag of a mold; Fig. 2 is a cross-section on the line II—II of Fig. 1; Fig. 3 is a perspective view of the end bar of Figs. 1 and 2; Fig. 4 is an enlarged partial elevation, partly in section, of the end bar; Fig. 5 is a plan view showing a modified form; Fig. 6 is a side elevation of the same, partly in section; Fig. 7 is a cross-section on the line VII—VII of Fig. 5; Fig. 8 is a partial end view of Fig. 5; and Fig. 9 is a detail view of the yielding guide, which I prefer to employ.

My invention relates to the supporting and guiding of gates or patterns without the use of a match plate resting in a rabbet in either the cope or drag.

The object of the invention is to provide an improved gate support and guide, which is also designed for receiving a mechanical vibrator for the patterns.

In the preferred form, the supporting carrier is arranged to receive a plurality of pattern gates which are adjustable along it; so that the carrier may receive different gates at different points in its length.

In both forms, the guide for the gate or runner is slightly yielding so as to provide for irregularities in manufacturing or machining. In both forms the carrier is also arranged to receive a vibrator engine.

In the drawings, referring to the form of Figs. 1 to 4, inclusive, 2, 2 are end bars of a carrier, the end portions 3, 3 of which are slotted and united by the end rods 4, 4, having threaded ends secured by lock nuts 5. These end portions 3, 3 are preferably of loop form, and the slots of the loops are arranged to receive the gate-supporting rods 6, which are held therein by adjustable lock nuts 7. These gate-supporting rods are adjustable along the bars 3 so as to bring the gates to the desired point. I show two gates of patterns 8, 8 in this form, each gate having branch gates connected to patterns shown at 9. The pattern-supporting rods 6 are shown as screwed into the ends of the gate or runner, and I have shown the outer threaded ends of the rods 6 as flattened on opposite sides to permit insertion within the slots or loop portions of the bars 3. This is also the case with the end bars 4, 4 of the frame. By this arrangement two or more gates or patterns can be built up into the adjustable carrier, the size of which can be changed both as to width and length to adapt it to any suitable sizes and shapes of gates or patterns, and of flasks. It is only necessary to release the lock nuts for the gate bars and the end bars to remove any gate of patterns and insert a new set or build up the end bars into another carrier. The rods 4, 4 may be substituted by other rods for other sizes of flasks.

Each bar 2 has a laterally enlarged portion 10 at its center, which is provided with a dovetailed transverse guideway receiving an adjustable guide 11 which is held in place by the undercutting or dovetailing of the recess. This guide 11 is preferably of the form shown in Fig. 9, having an elongated hole 12 to receive screw 13 which enters the enlarged portion 10, the front end of the guide having a V-shaped depending flange portion 14 which contacts with the guide pin 15 on the drag 16 of the flask. The guide 11 may slide in the guide-way and is pressed inwardly against the guide pin by a flat spring 17 whose ends are secured to the end face of the block 10 by screws 18, its intermediate portion bearing against the rounded end of the guide 11.

19 represents a mechanical vibrator or rapper, which is secured to the enlarged portion 10 by means of the bolt 20. In the use of this device, the cope, the drag, and the match, are recessed to receive the rods 6, these mating recesses forming holes through which the rods extend. The drag is first assembled bottom side up on the match with the gates of patterns lying between the match and drag, the rods 6 extending though holes formed by the mating recesses in the drag and match. The sand is then packed in the drag, the bottom board 21 applied, and the parts turned over. The match is then removed, and the cope shown in dotted lines at 22 is put in place, its end guides engaging the guide pins 15 on the drag. The cope is then rammed up in the usual manner, the cope lifted off, the patterns and bars removed, after rapping, and the cope then put back in place. In this form, when the cope and drag are assembled for filling the cope, the gates of patterns lie between the cope and drag with the rods 6 extending through the mating recesses in the sides of the cope and drag, the vibrator ends or bars 3 and the rods 4 lying outside of and inclosing the flask. The guides 11 are held in spring contact with the vertical guide pins or dowels on the drag, so that when the patterns are withdrawn from the sand they will be guided in parallelism. While the major portion of the adjustment of the bars 3 is accomplished by the adjustable rods and lock nuts, small variations in the position of the dowels will be compensated for by the yielding of the guides 11. This yielding of the guides also allows the vibrator bars 3 and the patterns to receive a slight vibration relative to the flask, thus loosening the patterns in the mold cavity without substantial vibration of the flask.

In Figs. 5 to 8, inclusive, I show another form of the invention with a single gate of patterns 8ª. In this case the vibrator bars 3ª are shortened, and the slotted end portions are dispensed with. In this form the vibrator ends are enlarged and cut out to form passageways 23 for the guide pins on the drag, a plate 24 being fastened across this passageway and containing the dovetailed guide-way for the guide 11ª. In this form also the guide has a slotted hole to receive the screw 13ª. and the spring arrangement 17ª is substantially the same as in the first form. In this form the gate or runway may be made integral with or permanently attached to both of the vibrator ends or bars; and in this case the patterns are not inclosed within a carrier, as in the first form.

The advantages of my invention result from the simplicity and ease of operation of the device and the accurate guiding of the pattern gates to and from their position. The outer spring-pressed guides compensate for slight irregularities and insure tight engagement between the guides and the pins. In the preferred form, provision is made for the use of the vibrator bars with different forms and sizes of gates, molds, &c.

The end rods 4 may or may not be used as desired, and other variations may be made in the form and arrangement of the parts without departing from my invention.

I claim:—

1. In molding apparatus, a pattern carrier having a yielding guide arranged to be pressed inwardly against a relatively fixed guide pin on the mold; substantially as described.

2. In molding apparatus, a pattern carrier having a yielding guide with an elongated inner face, and a spring arranged to press the guide inwardly against a relatively fixed guide pin of the mold; substantially as described.

3. In molding apparatus, a pattern carrier having slots or recesses arranged to allow adjustment of the gate supports laterally in the mold and lengthwise of the carrier; substantially as described.

4. In molding apparatus, a pattern carrier having gate supports adjustable longitudinally thereof, said carrier having a guide to engage a dowel or pin on the mold; substantially as described.

5. In molding apparatus, a pattern carrier consisting of end bars and adjustable side connecting rods outside the mold; substantially as described.

6. In molding apparatus, a pattern carrier consisting of end bars and adjustable side connecting rods outside the mold, said end bars having adjustable runway supports; substantially as described.

7. In molding apparatus, a pattern carrier comprising end bars having adjustable pattern supports arranged to connect them, said bars having guides arranged to engage dowel pins on the mold; substantially as described.

8. In molding apparatus, a pattern carrier comprising end bars having adjustable pattern supports arranged to connect them, said bars having yielding guides arranged to engage dowel pins on the mold; substantially as described.

9. In molding apparatus, a pattern carrier comprising end bars, gate supports connecting the end bars and adjustable along them, said bars having guides arranged to engage the dowel pins of the mold, and a vibrator secured to one of said bars; substantially as described.

10. In molding apparatus, a pattern carrier comprising end bars having end connecting rods arranged to be exterior to the mold, and removable gate supports connecting the bars, said bars having yielding guides to engage the dowel pins of the mold; substantially as described.

11. In molding apparatus, a pattern carrier having an inwardly movable guiding slide with a vertically elongated inner face, and a spring arranged to press said guide inwardly against a guide pin on the mold; substantially as described.

12. In molding apparatus, a pattern carrier having a dovetailed sliding guide, and a spring arranged to press said guide inwardly against a guide pin on the mold; substantially as described.

13. In molding apparatus, a pattern carrier having end bars, and gate supports connected to the end bars and adjustable in two directions at right angles to each other, substantially as described.

14. In molding apparatus, a pattern carrier having a gate support secured thereto, said gate support being adjustable along the carrier and also in an endwise direction at right angles thereto, substantially as described.

In testimony whereof, I have hereunto set my hand.

WILLIAM G. MOORE.

Witnesses:
 OWEN S. WRIGHT,
 CARL C. GIBBS.